Inventors.
Karlheinz Gosslau,
Hans-Joachim Harloff,
Friedrich Ohmann, &
Gerd Schneider.
By [signature] Atty.

3,237,172

IMPULSE STORAGE MATRIX COMPRISING MAGNET CORES HAVING RECTANGULAR HYSTERESIS LOOPS

Karlheinz Gosslau, Hans Joachim Harloff, Friedrich Ohmann, and Gerd Schneider, Munich, Germany, assignors to Siemens & Halske Aktiengesellschaft, Berlin and Munich, Germany, a corporation of Germany Filed Feb. 14, 1958, Ser. No. 715,314
Claims priority, application Germany, Feb. 22, 1957, S 52,459, Patent 572,132
3 Claims. (Cl. 340—174)

This invention is concerned with a storage matrix comprising magnet cores having rectangular hysteresis loops.

In the communication art, especially in the art relating to data processing machines, for example, calculating machines, there are frequently used storage elements in the form of magnet cores with at least approximately rectangular hysteresis loop. It is customary to combine the cores for storage purposes in a matrix and to trigger the individual cores for storage or for sensing operations by conducting over each one of the mutually crossing lines of both dimensions or coordinates, that is, over the so-called X- and Y-conductor, a current of such a value that the addition or summation of both currents can change the remanence condition of a core. The addition or summation takes place at a crossing point and, therefore, in a matrix of desired size, can become effective only at one core.

In addition to the trigger lines or conductors which extend, as noted, in the two dimensions of the matrix, there is provided for each individual magnet core a sensing winding which is linked with a plurality of cores, for example, with all cores disposed in one plane.

Since the magnet cores used for storage purposes practically do not have a strictly rectangular hysteresis loop, there are generated incident to each triggering operation interference pulses in each individual core of a control row or column, even in all cores that are not to be triggered but are disposed in the same row or column as the core to be triggered, which interference pulses are induced by the triggering impulses incident to a storage or incident to a sensing operation. The sensing winding or conductor must for this reason be arranged so that the individual interference pulses, in a sensing winding linked with a plurality of cores, are not added, but are compensated, because it would otherwise be impossible to recognize at the output of a sensing winding, especially if such winding should be linked with many or, for example, with all cores of a matrix, whether the impulse occurring responsive to a sensing operation comes from the demagnetizing of an individual core or is due to the addition or summation of interference pulses of several cores which had not been demagnetized. It has for this reason become customary to conduct or to extend the sensing winding diagonally through the individual cores of a plane, so as to satisfy the compensation requirement. The diagonal winding can be provided only by manual operations, because the relatively thin sensing wire cannot be carried through the very small cores by machine operation. In addition, the sensing loop is in the diagonal arrangement rendered very long.

The invention is concerned with an arrangement of a sensing winding or conductor, in such storage matrices, proposing an entirely new way of effecting the compensation for the interference pulses. In the storage matrix according to the invention, the sensing conductor is disposed parallel to one of the control lines or conductors and the interference pulses induced by the partially energized cores are compensated by means of compensation cores arranged within the matrix of the sensing conductor, incident to sensing and storage operations, by proper triggering of the compensation cores.

It is particularly advantageous and of practically great importance, to utilize the compensation cores as storage cores, that is, to construct the storage matrix, taking care, either by proper choice of the triggering of the individual cores or by proper arrangement of the sensing conductor parallel to one of the control lines, so that one matrix can be utilized for storage functions, as until now, but at the same time fulfilling the above explained compensation conditions.

The various objects and features of the invention will appear from the description which will be rendered below with reference to the accompanying drawing showing sectors of magnetic core matrices. In the drawings, FIG. 1 shows a storage matrix comprising 24 cores;

FIG. 2 indicates the triggering along the Y-line or conductor;

Figure 1:
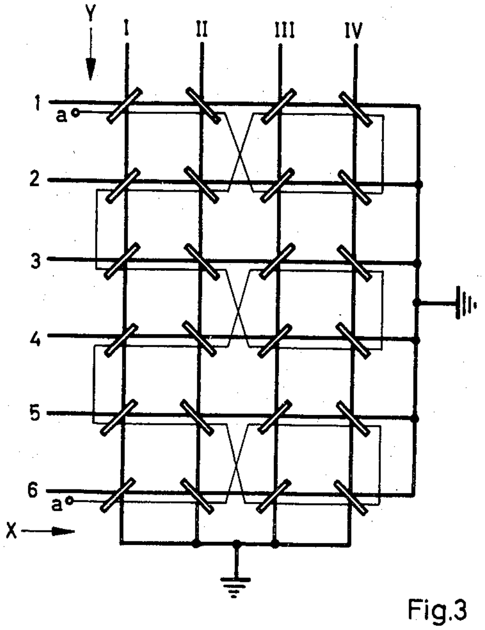

In FIG. 1, the cores M are arranged in four columns each having six cores or in six rows each having four cores. The control lines or conductors I to IV linked with the cores in the coordinate direction of the columns may be referred to as Y-lines and the control lines 1 to 6 linked with the cores in the coordinate direction of the rows may be referred to as X-lines. In addition to these control lines, each individual core is linked with a sensing line extending between the terminals *a—a*. The sensing winding meanders in parallel with the X-lines, the individual meander loops being crossed in such a manner that a portion of the loop appears as a feed and return conductor in each individual row. The individual cores of the matrix are referred to according to their column and row number, respectively.

Figure 2:
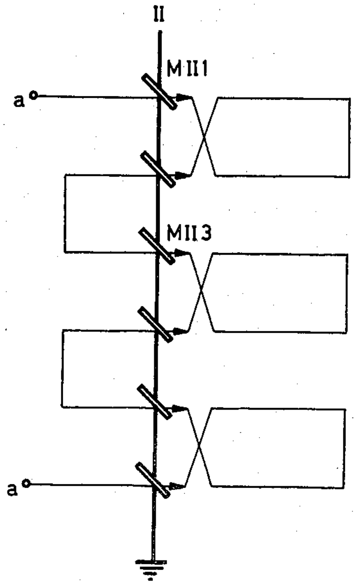

It may be assumed, for explaining the operation, that the magnet core shown in FIG. 2 at MII3, that is, the core positioned in column II and row 3 is to be triggered. Depending upon the remanence conditions of the core, there will be induced in the output winding, upon triggering, a corresponding current or no current. The novel arrangement of the sensing winding *a—a* suppresses any interference pulse therein. This operation will now be explained, first for the triggering of the Y-column, with reference to FIG. 2.

A triggering impulse flowing along control line II from the top downwardly will induce at the core MII1 as well as at all further cores of the corresponding column II, a current impulse in the sensing winding which is directed to the right. The magnitude of this interference pulse is at all cores approximately the same. It will at once be realized from FIG. 2, that these interference pulses are compensated in pairs and that no voltage can occur at the terminals *a—a* in the absence of corresponding triggering in the third row, resulting in opposite magnetization of the core.

Figure 3:
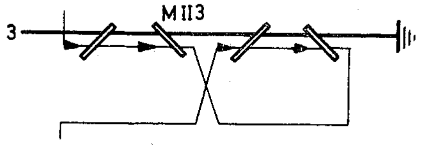
FIG. 3 illustrates the conditions along row 3 of FIG. 1.

The conditions with respect to row 3 are separately shown in FIG. 3. A current flowing in the X-line from right to left induces in the sensing winding at all cores, an interference pulse directed to the right. The use of the crossing meandering loop as a pickup winding, such that the row is linked in part with a feed line and in part with a return line, effects compensation of these interference pulses, so that these interference pulses are again prevented from inducing a voltage at the terminals of the sensing line.

As has been demonstrated with reference to the above described conditions along particular coordinates Y and X, all interference pulses induced in the sensing winding are compensated. Since these conditions also obtained in the case of larger matrices, it follows, that the compensation in pairs is obtained in such matrices as in the case of the illustrated matrix parts, provided that there is an even number of coordinates, that is, rows and of columns, respectively.

It has been proposed, for relatively large storage units, to arrange several storage planes in parallel relationship and to trigger all of them in parallel so as to save triggering means. In order to prevent storage of a given information in similarly disposed cores of each plane, counter impulses are impressed in all planes which are not to be energized, such counter impulses blocking these planes for storage and for sensing, respectively. It is necessary for this purpose, to link the cores of the planes with an auxiliary blocking winding which is also referred to as inhibit-winding or as Z-winding or conductor. The blocking impulse is given over such winding and prevents energization of one core in the plane despite triggering over two lines.

It is in the embodiment according to FIG. 1 entirely feasible to provide a Z-conductor extending in parallel to the Y-lines. In case all these Z-conductors are energized in parallel, by a blocking impulse, such impulse, just as in the case of the Y-conductor, cannot induce interference pulses in the sensing winding since the interference pulses derived from the individual cores are compensated as explained in connection with FIG. 2. It is, however, in practice impossible to arrange the Z-conductor in the form of parallel lines in one plane, because the current consumption, especially in the case of large matrices, would be very great. There is for this reason utilized, as a Z-conductor, a meandering conductor extending generally in parallel to one of the control conductors, such Z-conductor permeating all cores in a plane or, in case of special structures of magnetic storage apparatus, portions of a plane.

Interference pulses induced by the impulses over the Z-conductor and occurring in a non-energized plane, are not as a rule as troublesome as interference pulses induced by the impulses conducted to the control lines; however, suppression of the corresponding interference pulses may be of great interest whenever there is danger, due to high operating speed, that these interference pulses might adversely affect a subsequent sensing pulse. Another danger resides in the possibility that interference pulses of great magnitude, induced in the sensing winding of a non-energized plane, may falsify stored information, or that such interference pulses might by induction, similar to the cross-talk effect, produce an impulse in a neighboring plane that should not occur therein.

Figure 4:
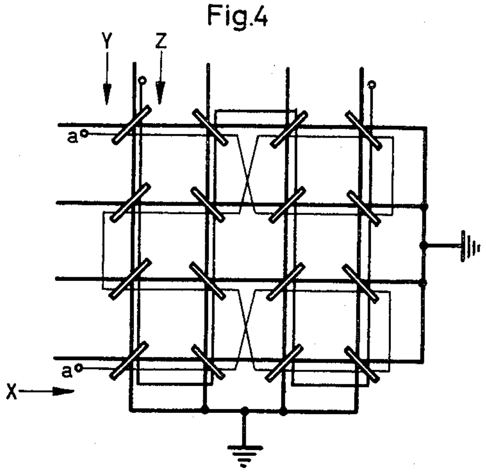
FIG. 4 shows an example of arranging the cores within a plane so that a meandering blocking winding or conductor extends in preferred direction.

In the previously practiced manner of diagonally disposing the sensing winding, interference pulses induced by blocking impulses could not be compensated. In accordance with another feature, the invention makes this possible by arranging the cores within a plane in herringbone-like manner, that is, disposing the magnet cores so as to slant about 45° to the right in the coordinate while slanting in the adjacent coordinate, row or column, about 45° to the left, the meandering blocking winding extending in this manner in preferred direction of the pattern. FIG. 4 shows an example of such an embodiment, wherein the cores of any two adjacent columns slant angularly in opposite directions.

In FIG. 4, the Z-winding extends in individual sections parallel to the Y-conductors, meandering throughout the entire matrix. The compensation of the control pulses conducted over the X- and Y-conductors is effected in the manner already explained in connection with FIGS. 2 and 3. The compensation of the impulses conducted over the Z-winding will be explained with reference to FIG. 5.

Figure 5:
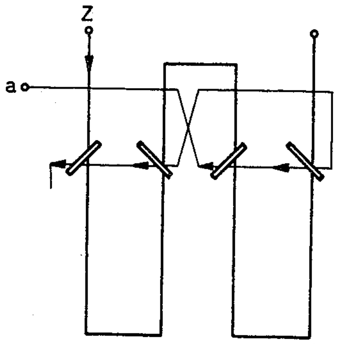
FIG. 5 illustrates an example of the arrangement of a single row of cores.

As will be seen from FIG. 5, and assuming that a current flows through the Z-conductor in the direction of the arrow, an interference impulse will be induced to the left, in the sensing winding at all cores. The individual interference impulses are compensated within the loop of the sensing winding which extends with respect to the X-conductor in the form of a crossing meandering loop.

Only one row appears in FIG. 5, but the conditions in the other rows are the same, and it will therefore be readily realized that no interference pulses can be induced in the sensing winding of an entire plane, by impulses from the Z-conductor.

Figure 6:
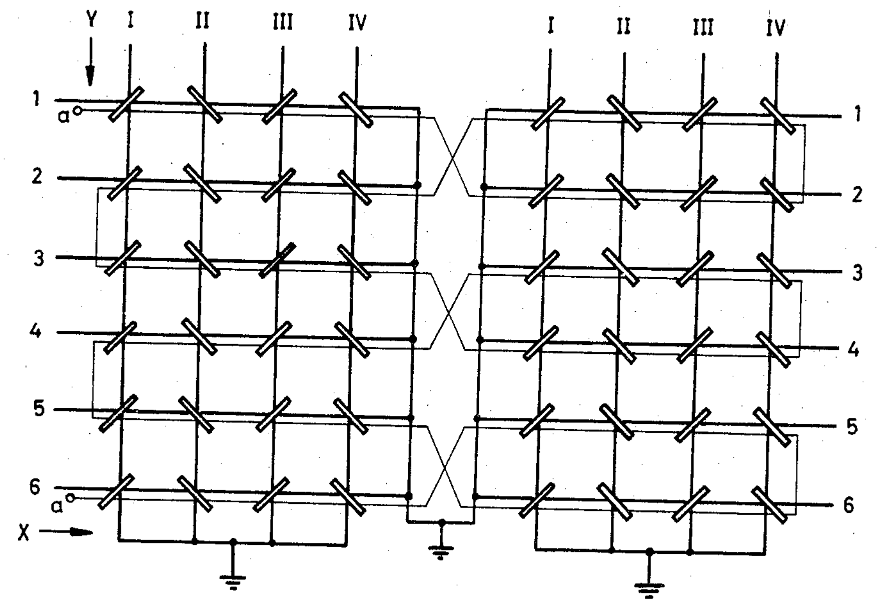
FIG. 6 shows an arrangement in which the sensing winding extends in meandering manner alternately between two respective rows so that it is linked in each direction with the same number of cores.

The invention is not inherently limited to the illustrated and described matrix embodiments. As will be readily realized, it is entirely feasible to allot the cores at the left of the crossing points of the sensing winding (FIG. 1) to an individual matrix while allotting the cores at the right of these points to another matrix, and to dispose the sensing winding for both planes in common, in such a manner, that the described compensation conditions are satisfied. Such an arrangement is shown in FIG. 6. Parts corresponding to those also shown in FIG. 1 are identically referenced in FIG. 6. The purpose and object of the invention will be obtained in such a case. It is not at all necessary in connecting two matrices in opposition, to connect the individual rows in opposition, which would require correspondingly many connecting lines between the two matrices, since such matrices may be connected in opposition as a unit, such that the interference pulses are compensated. The only requirement for such a case is, that both matrices have identical numbers of cores.

As will be appreciated from the portions shown in FIGS. 2 and 3, that it is in case of a plane storage matrix, that is, a matrix without a Z-winding, not absolutely necessary to dispose the cores oppositely inclined in adjacent coordinates. Such arrangement of the cores provides only in connection with a Z-winding the advantage that the impulses conducted by way of the Z-winding impart to the induced interference pulses a direction, such that they are compensated and cannot become additively effective in the sensing winding.

Changes may be made within the scope and spirit of the appended claims.

We claim:

1. A signal storage device constructed of a plurality of magnet cores with at least approximately rectangular hysteresis loop, said cores arranged in a plurality of lines in two coordinate directions forming rows and columns, said cores being interlinked with at least two control windings and further interlinked with a sensing winding that is common to at least a plurality of said cores and having portions extending in parallel with said rows and columns, said sensing winding being disposed in meandering manner with each successive parallel portion thereof, extending in one of said coordinate directions, being disposed in an adjacent line extending in such coordinate direction, with a crossover to an adjacent line taking place midway between the total number of cores interlinked by said winding in the line involved, following each successive odd numbered of such successive parallel portions, with such winding extending in interlinking relationship with equal numbers of cores in each of the rows and columns in either direction of its meandering course whereby interference pulses induced into said sensing winding are compensated therein.

2. A signal storage device constructed of a plurality of magnet cores with at least approximately rectangular hysteresis loop, said cores arranged in a plurality of lines in two coordinate directions forming rows and columns, said cores being interlinked with at least two control windings and further interlinked with a sensing winding that is common to at least a plurality of said cores and having portions extending in parallel with said rows and columns, said sensing winding being disposed in meandering manner with portions thereof alternately disposed in sucessive pairs of lines in one of said coordinate directions, with such winding extending in interlinking relationship with equal numbers of cores in each of the rows and columns in either direction of its meandering course whereby interference pulses induced into said sensing winding are compensated therein, and an inhibit winding extending in meandering manner within a storage plane, the cores in any two adjacent lines extending in coordinate direction being in said plane angularly oppositely inclined such that the turns of said inhibit winding extend in direction of equal core orientation determined by the inclination of said cores.

3. A signal storage device comprising two storage planes, each having a plurality of magnet cores with at least approximately rectangular hysteresis loop, said cores arranged in a plurality of lines in two coordinate directions forming rows and columns, said cores being interlinked with at least two control windings and further interlinked with a sensing winding that is common to at least a plurality of said cores and having portions extending in parallel with said rows and columns, said sensing winding being disposed in meandering manner with each successive parallel portion thereof, extending in one of said coordinate directions, being disposed in an adjacent line extending in such coordinate direction, with a crossover to an adjacent line taking place midway between the total numer of cores interlinked by said winding in the line involved, following each successive odd numbered of such successive parallel portions, with such winding extending in interlinking relationship with equal numbers of cores in each of the rows and columns in either direction of its meandering course whereby interference pulses induced into said sensing winding are compensated therein, the portions of the sensing winding which extend parallel to the lines of such different storage planes being connected in opposition to effect the compensation within the sensing winding.

References Cited by the Examiner

UNITED STATES PATENTS

| | | | |
|---|---|---|---|
| 2,732,542 | 1/1956 | Minnick | 340—166 |
| 2,802,203 | 8/1957 | Stuart-Williams | 340—174 |
| 2,880,406 | 3/1959 | Bindon et al. | 340—166 X |
| 2,929,050 | 3/1960 | Russell | 340—174 |
| 3,008,130 | 11/1961 | Devaud et al. | 340—174 |
| 3,102,328 | 9/1963 | Schultz et al. | 340—174 X |
| 3,134,163 | 5/1964 | Luhn | 340—174 |

FOREIGN PATENTS

| | | |
|---|---|---|
| 769,384 | 3/1957 | Great Britain. |

IRVING L. SRAGOW, *Primary Examiner.*

EVERETT R. REYNOLDS, JOHN F. BURNS, *Examiners.*